United States Patent
Ueda (10) Patent No.: US 9,291,885 B2
(45) Date of Patent: Mar. 22, 2016

(54) MULTIPLE LIGHT PROJECTION TYPE IMAGE DISPLAY APPARATUS COMBINING AND PROJECTING LIGHTS FROM LIGHT SOURCES AND CONTROL APPARATUS THEREFOR

(71) Applicant: Panasonic Corporation, Kadoma-shi, Osaka (JP)

(72) Inventor: Akira Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 353 days.

(21) Appl. No.: 13/899,200

(22) Filed: May 21, 2013

(65) Prior Publication Data

US 2013/0313994 A1 Nov. 28, 2013

(30) Foreign Application Priority Data

May 23, 2012 (JP) ................................. 2012-117381
May 16, 2013 (JP) ................................. 2013-104305

(51) Int. Cl.
*H05B 41/16* (2006.01)
*G03B 21/20* (2006.01)
*H05B 37/02* (2006.01)

(52) U.S. Cl.
CPC ........ *G03B 21/2053* (2013.01); *G03B 21/2013* (2013.01); *H05B 37/0209* (2013.01); *G03B 21/2066* (2013.01)

(58) Field of Classification Search
CPC ........... G03B 21/2053; H03B 37/0209; H03B 37/0281

USPC ............. 315/250, 246, 247, 200 A, 308, 291, 315/210, 209 R, 368.11, 368.13, 88; 348/744, 742, 771, 471, 746, 748, 806; 353/84, 31, 94, 99, 85, 20, 33; 359/850, 872, 485; 362/341, 234, 237, 362/238, 551; 345/32

See application file for complete search history.

(56) References Cited

U.S. PATENT DOCUMENTS

| | | | |
|---|---|---|---|
| 7,165,845 B2 | 1/2007 | Takeda et al. | |
| 7,207,677 B2 | 4/2007 | Takeda et al. | |
| 7,456,586 B2 * | 11/2008 | Morejon | H05B 33/0827 315/200 A |
| 2003/0218794 A1 * | 11/2003 | Takeda | G03B 33/06 359/292 |
| 2014/0062328 A1 * | 3/2014 | Toyooka | H05B 37/0281 315/210 |

FOREIGN PATENT DOCUMENTS

| | | |
|---|---|---|
| JP | 2004-145249 | 5/2004 |
| JP | 2009-204646 | 9/2009 |

\* cited by examiner

*Primary Examiner* — Lincoln Donovan
*Assistant Examiner* — Thomas Skibinski
(74) *Attorney, Agent, or Firm* — Hamre, Schumann, Mueller & Larson, P.C.

(57) ABSTRACT

In a control apparatus for use in a multiple light projection type image display apparatus, the control apparatus includes a light source driver part configured to drive a plurality of light sources; and an apparatus controller configured to control the light source driver part. The light source driver part drives the plurality of light sources at respective different frequencies.

6 Claims, 8 Drawing Sheets

MULTIPLE LIGHT PROJECTION TYPE IMAGE DISPLAY APPARATUS COMBINING AND PROJECTING LIGHTS FROM LIGHT SOURCES AND CONTROL APPARATUS THEREFOR

BACKGROUND OF THE DISCLOSURE

1. Field of the Disclosure

The present disclosure relates to a multiple light projection type image display apparatus that combines lights from a plurality of light sources and projects a resulting light, and a control apparatus therefor.

2. Description of the Related Art

As a projection type image display apparatus (hereinafter described also simply as a "projector"), there are a liquid crystal projector that projects images by making light penetrate a liquid crystal display device, and a DLP (Digital Light Processing) (registered trademark of Texas Instruments Incorporated) that projects images by reflecting light on a reflection type mirror device such as a DMD (Digital Micromirror Device).

As white light sources used for these projectors, there are used discharge lamps of high intensities such as a high pressure mercury lamp, a xenon lamp, and a metal halide lamp.

When a discharge lamp is driven by a direct current power source, the lifetime of the lamp is disadvantageously shortened since the temperature of the anode becomes higher than that of the cathode due to collision of electrons with the anode at the time of arc discharge.

Therefore, it is beneficial to drive the anode and the cathode in a cyclical switchover manner by applying an alternating current of a predetermined frequency to the electrode pair.

Moreover, in order to achieve high brightness, a multiple light type projector that projects light combined from a plurality of light sources has been generally known (See a Patent Document 1 of Japanese patent laid-open publication No. JP 2009-204646 A).

Since the light sources 211 and 221 of the Patent Document 1 are stepped down by a down converter 91, the operating frequencies of the switching devices become the same as each other.

Accordingly, for example, it is assumed that the operating frequency of the power source is 100 kHz±5%, the peak value of the unnecessary radiation level of the light source 211 is 21 dB, and the peak value of the unnecessary radiation level of the light sources 221 is 20 dB.

Then, the unnecessary radiation characteristic 28 of a total of unnecessary radiation characteristic 26 of the light source 211 and the unnecessary radiation characteristic 27 of the light source 221 are added up in an overlapped manner in the vicinity of the frequency of 100 kHz±5%, and therefore, the peak value of the unnecessary radiation level as a multiple light projector becomes 41 dB of the total of peak values of the unnecessary radiation levels of the light source 211 and the light source 221.

That is, the peak value of the unnecessary radiation level as the multiple light projector disadvantageously becomes a value that exceeds the peak value of the unnecessary radiation level of the individual light sources.

SUMMARY OF THE DISCLOSURE

An object of the present disclosure is to solve the aforementioned problems, and provide a multiple light projection type image display apparatus capable of reducing the peak value of the unnecessary radiation level, and a control apparatus therefor.

According to one aspect of this disclosure, there is provided a control apparatus for use in a multiple light projection type image display apparatus, and the control apparatus includes a light source driver part configured to drive a plurality of light sources; and an apparatus controller configured to control the light source driver part. The light source driver part drives the plurality of light sources at respective different frequencies.

According to the multiple light projection type image display apparatus and the control apparatus therefor of the present disclosure, the peak value of the unnecessary radiation level of the unnecessary radiations generated from the switching devices can be reduced.

BRIEF DESCRIPTION OF THE DRAWINGS

These and other objects and features of the present disclosure will become clear from the following description taken in conjunction with the embodiments thereof with reference to the accompanying drawings throughout which like parts are designated by like reference numerals, and in which.

DETAILED DESCRIPTION OF THE EMBODIMENTS

Embodiments of the present disclosure will be described below with reference to the drawings. It is noted that like components are denoted by like reference numerals, and no description is provided for them in the following embodiments.

First Embodiment

Figure 1:
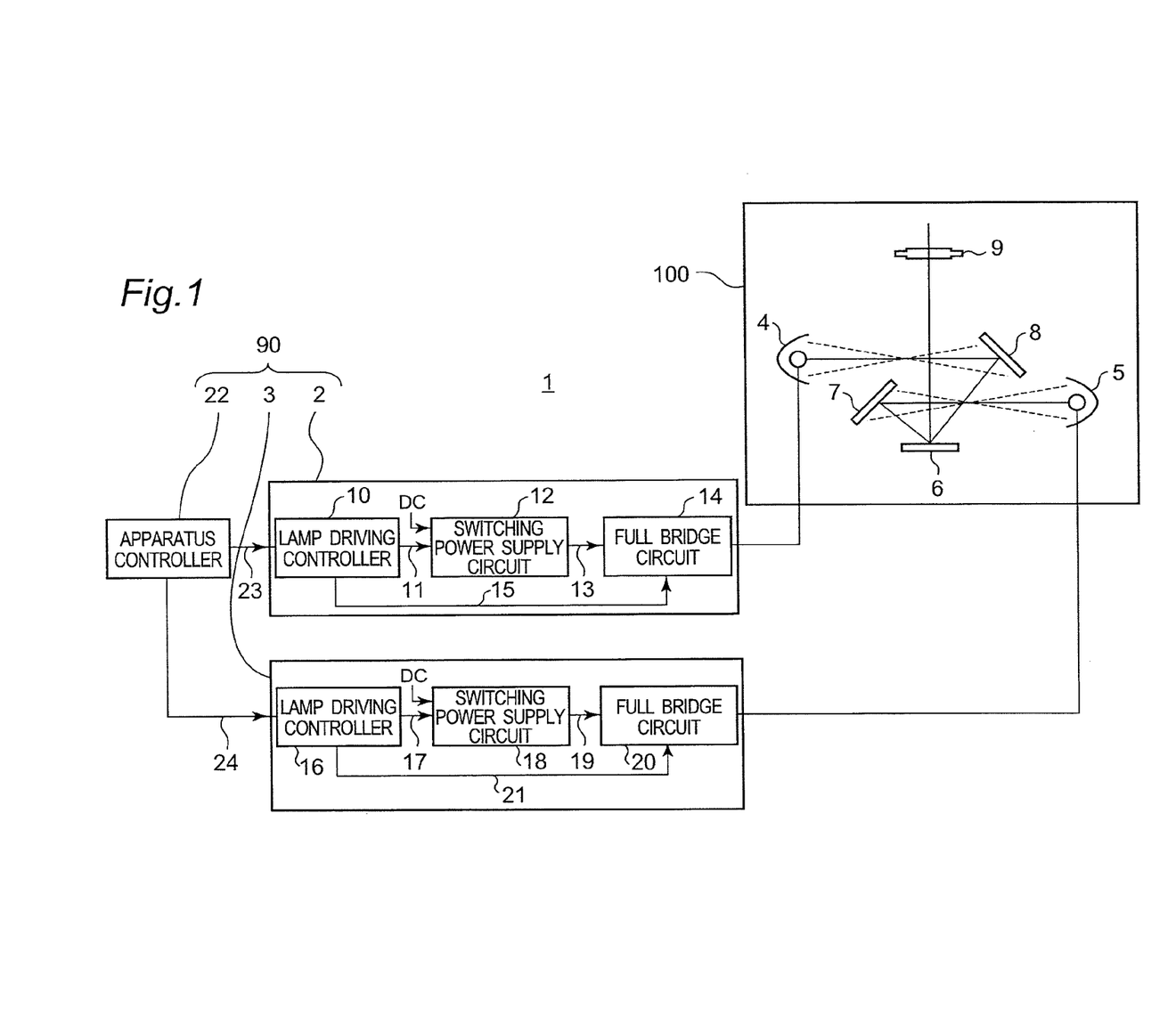
FIG. 1 is a block diagram showing a configuration of a multiple light projection type image display apparatus 1 according to a first embodiment of the present disclosure.

FIG. 1 is a block diagram showing a configuration of a multiple light projection type image display apparatus 1 according to the first embodiment of the present disclosure. The multiple light projection type image display apparatus 1 of FIG. 1 is configured to include a light source apparatus 100 that includes light sources 4 and 5 with reflectors as light source parts, and a control apparatus 90 that controls turning on of the light sources 4 and 5 with reflectors. Moreover, the control apparatus 90 is configured to include a light source driver part 2 that drives the light source 4 with the reflector, a light source driver part 3 that drives the light source 5 with the reflector, and an apparatus controller 22 that controls the light source driver parts 2 and 3. Further, the light source apparatus 100 is configured to include the two light sources 4 and 5 with reflectors, a reflection type image display device 6 that outputs images, and mirrors 7 and 8 that guide outgoing beams of light from the light sources 4 and 5 with the reflectors to the reflection type image display device 6.

The light source driver part 2 of FIG. 1 is configured to include a lamp driving controller 10 that controls switching of switching devices that configure a switching power supply circuit 12 described later, the switching power supply circuit 12 that converts a direct current voltage DC into a predetermined voltage in accordance with a switching timing signal 11 outputted from the lamp driving controller 10, and a full bridge circuit 14 that drives the light source 4 with the reflector by alternating current. Moreover, the light source driver part 3 is configured to include a lamp driving controller 16 that controls switching of switching devices that configure a switching power supply circuit 18 described later, the switching power supply circuit 18 that converts a direct current voltage DC into a predetermined voltage in accordance with the switching timing signal 11 outputted from the lamp driving controller 16, and a full bridge circuit 20 that drives the light source 5 with the reflector by alternating current. In this case, each of the switching power supply circuits 12 and 18 includes switching devices, and a capacitor, a coil and a diode as a rectifier circuit, and each of the full bridge circuits 14 and 20 is configured as a bridge circuit in which four switching devices are connected together.

Referring to FIG. 1, the outgoing beams of light from the light sources 4 and 5 with the reflectors are reflected by the mirrors 7 and 8, and guided to the reflection type image display device 6. Moreover, the beams of light from the light sources 4 and 5 collected by the mirrors 7 and 8 are reflected by the reflection type image display device 6 that outputs an image, and projected to be enlarged via a projection lens 9.

The apparatus controller 22 generates a control signal 23 for setting a first operating frequency of the switching power supply circuit 12, and outputs the control signal 23 to the lamp driving controller 10. Moreover, the apparatus controller 22 of FIG. 1 generates a control signal 24 for setting a second operating frequency of the switching power supply circuit 18, and outputs the control signal 24 to the lamp driving controller 16.

The lamp driving controller 10 generates the switching timing signal 11 for turning on/off the switching devices that configure the switching power supply circuit 12, and outputs the switching timing signal 11 to the switching power supply circuit 12. Moreover, the lamp driving controller 16 generates a switching timing signal 17 for turning on/off the switching devices that configure the switching power supply circuit 18, and outputs the switching timing signal 17 to the switching power supply circuit 18. In this case, the control signal 23 and the control signal 24 from the apparatus controller 22 may be synchronized or not synchronized with each other.

The switching power supply circuit 12 converts an inputted direct current voltage DC into an alternating current voltage by turning on/off the direct current voltage by the duty ratio of the switching timing signal 11 on the basis of the switching timing signal 11 inputted from the lamp driving controller 10, thereafter rectifies the resulting voltage into a predetermined direct current voltage 13, and outputs the direct current voltage 13 to the full bridge circuit 14. Moreover, the switching power supply circuit 18 converts the inputted direct current voltage DC into an alternating current voltage by turning on/off the direct current voltage by the duty ratio of the switching timing signal 17 on the basis of the switching timing signal 17 inputted from the lamp driving controller 16, thereafter rectifies the resulting voltage into a predetermined direct current voltage 19, and outputs the direct current voltage 19 to the full bridge circuit 20. In this case, the switching timing signals 11 and 17 are the timing signals for turning on/off the switching devices, respectively, that configure the switching power supply circuits 12 and 18 to operate the switching devices on the basis of the timing signals, and are converted into a predetermined direct current voltage corresponding to the ratio (duty ratio) of the turning on/off times of the switching devices.

The full bridge circuit 14 converts the direct current voltage 13 inputted from the switching power supply circuit 12 into an alternating current signal having a predetermined frequency by performing alternate switching control of a pair of mutually opposing switching devices and the other pair of switching devices of the full bridge circuit 14 by using a full bridge timing signal 15 inputted from the lamp driving controller 10, and turns on the light source 4 with the reflector by transmitting the alternating current signal to the light source 4 with the reflector. Moreover, the full bridge circuit 20 converts the direct current voltage 19 outputted from the switching power supply circuit 18 into an alternating current signal having a predetermined frequency by performing alternate switching control of a pair of mutually opposing switching devices and the other pair of switching devices of the full bridge circuit 20 by using a full bridge timing signal 21 inputted from the lamp driving controller 16, and turns on the light source 5 with the reflector by transmitting the alternating current signal to the light source 5 with the reflector.

Figure 2:
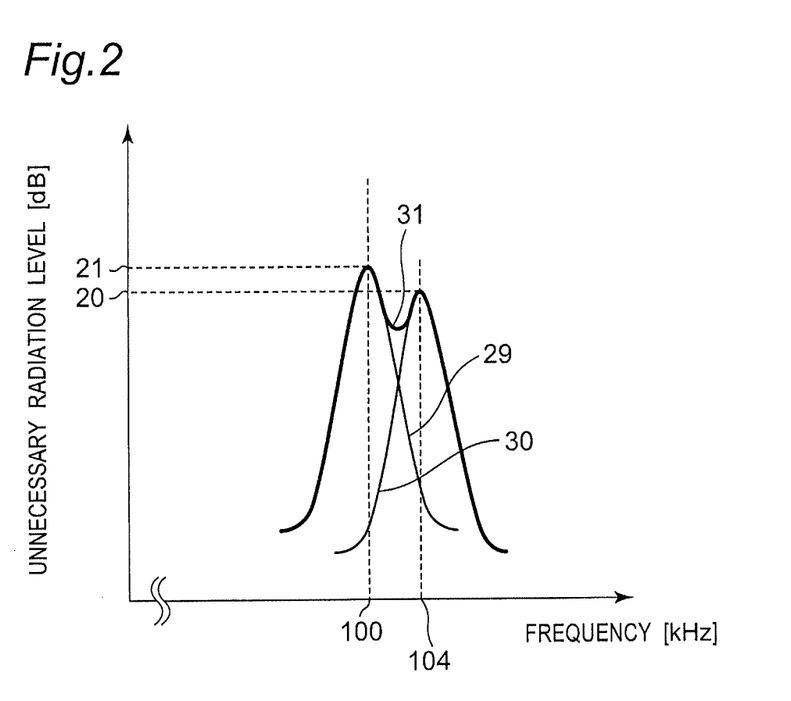
FIG. 2 is a spectral diagram showing frequency characteristics of unnecessary radiations generated from switching power supply circuits 12 and 18 of the light source driver parts 2 and 3 of the multiple light projection type image display apparatus 1 of FIG. 1.

FIG. 2 is a spectral diagram showing frequency characteristics of unnecessary radiations generated from the switching power supply circuits 12 and 18 of the light source driver parts 2 and 3 of the multiple light projection type image display apparatus 1 of FIG. 1. In FIG. 2, 29 denotes a frequency characteristic of unnecessary radiation generated from the switching power supply circuit 12, 30 denotes a frequency characteristic of unnecessary radiation generated from the switching power supply circuit 18, and 31 denotes a frequency characteristic of unnecessary radiation of a total of frequency characteristic 29 and the frequency characteristic 30. In this case, when the first operating frequency of the switching power supply circuit 12 is set to 100 kHz±5%, and the second operating frequency of the switching power supply circuit 18 is set to 104 kHz±5%, the frequency characteristic 29 varies with a value in the vicinity of ±5% around the peak value of 100 kHz, and the frequency characteristic 30 varies with a value in the vicinity of ±5% around the peak value of 104 kHz. Moreover, the peak value of the unnecessary radiation level of the frequency characteristic 29 becomes 21 dB, and the peak value of the unnecessary radiation level of the frequency characteristic 30 becomes 20 dB. Further, since a difference between the first operating frequency and the second operating frequency becomes equal to or greater than a predetermined value, the peak of the frequency characteristic 29 and the peak of the frequency characteristic 30 deviate from each other. Therefore, the peak value of the unnecessary radiation level of the frequency characteristic 31 that is the total of frequency characteristic 29 and the frequency characteristic 30 becomes a value in the vicinity of 21 dB identical to the peak value of the unnecessary radiation level of the frequency characteristic 29.

As described above, when the difference between the frequency at which the unnecessary radiation level of the unnecessary radiation generated from the switching power supply circuit 12 becomes a peak and the frequency at which the unnecessary radiation level of the unnecessary radiation generated from the switching power supply circuit 18 becomes a peak is set equal to or greater than the predetermined value, the peak value of the unnecessary radiation level of the total of unnecessary radiations generated from the switching power supply circuits 12 and 18 is reduced further than the peak value 41 dB of the unnecessary radiation level of the unnecessary radiations of these added up in an overlapped manner in an identical frequency band. This is described in detail below.

Figure 3A:
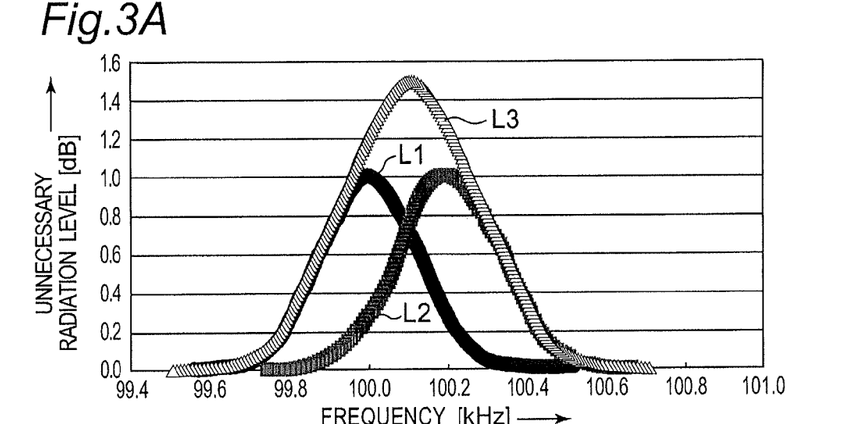
FIG. 3A is a spectral diagram showing frequency characteristics of a total of unnecessary radiations generated from the switching power supply circuits 12 and 18 when a difference between the operating frequency of the switching power supply circuit 12 of FIG. 1 and the operating frequency of the switching power supply circuit 18 of FIG. 1 is set to a first predetermined value.

FIG. 3A is a spectral diagram showing a frequency characteristic of the total of unnecessary radiations generated from the switching power supply circuits 12 and 18 when the difference between the operating frequency of the switching power supply circuit 12 of FIG. 1 and the operating frequency of the switching power supply circuit 18 of FIG. 1 is set to a first predetermined value. In FIG. 3A, the operating frequency of the switching power supply circuit 12 is set to 100 kHz, and the first predetermined value is set to 100 kHz× 0.2%=0.2 kHz. That is, the operating frequency of the switching power supply circuit 18 is set to 100.2 kHz. In this case, L1 denotes a frequency characteristic of the unnecessary radiation generated from the switching power supply circuit 12, L2 denotes a frequency characteristic of the unnecessary radiation generated from the switching power supply circuit 18, and L3 denotes a frequency characteristic of the unnecessary radiation of the total of frequency characteristic L1 and the frequency characteristic L2. Therefore, the peak value of the unnecessary radiation level of the frequency characteristic L3 is much greater than the peak value of the unnecessary radiation level of the frequency characteristic L1 and the frequency characteristic L2.

Figure 3B:
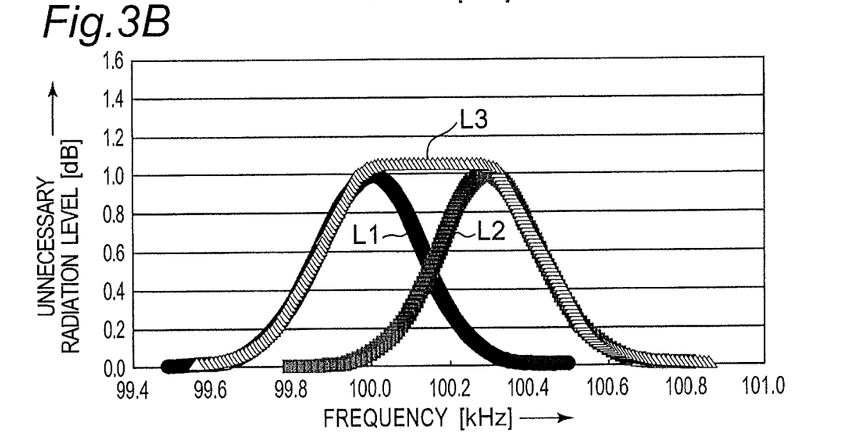
FIG. 3B is a spectral diagram showing frequency characteristics of a total of unnecessary radiations generated from the switching power supply circuits 12 and 18 when the difference between the operating frequency of the switching power supply circuit 12 of FIG. 1 and the operating frequency of the switching power supply circuit 18 of FIG. 1 is set to a second predetermined value.

FIG. 3B is a spectral diagram showing frequency characteristics of the total of unnecessary radiations generated from the switching power supply circuits 12 and 18 when the difference between the operating frequency of the switching power supply circuit 12 of FIG. 1 and the operating frequency of the switching power supply circuit 18 of FIG. 1 is set to a second predetermined value. In FIG. 3B, the operating frequency of the switching power supply circuit 12 is set to 100 kHz, and the second predetermined value is set to 100 kHz× 0.3%=0.3 kHz. That is, the operating frequency of the switching power supply circuit 18 is set to 100.3 kHz. In this case, L1 denotes a frequency characteristic of the unnecessary radiation generated from the switching power supply circuit 12, L2 denotes a frequency characteristic of the unnecessary radiation generated from the switching power supply circuit 18, and L3 denotes a frequency characteristic of the unnecessary radiation of the total of frequency characteristic L1 and the frequency characteristic L2. Therefore, the peak value of the unnecessary radiation level of the frequency characteristic L3 is slightly greater than the peak value of the unnecessary radiation levels of the frequency characteristic L1 and the frequency characteristic L2.

Figure 3C:
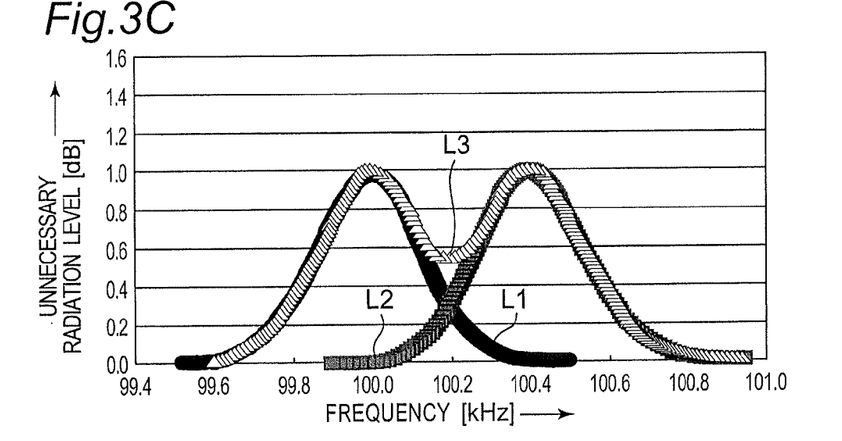
FIG. 3C is a spectral diagram showing frequency characteristics of a total of unnecessary radiations generated from the switching power supply circuits 12 and 18 when the difference between the operating frequency of the switching power supply circuit 12 of FIG. 1 and the operating frequency of the switching power supply circuit 18 of FIG. 1 is set to a third predetermined value.

FIG. 3C is a spectral diagram showing frequency characteristics of the total of unnecessary radiations generated from the switching power supply circuits 12 and 18 when the difference between the operating frequency of the switching power supply circuit 12 of FIG. 1 and the operating frequency of the switching power supply circuit 18 of FIG. 1 is set to a third predetermined value. In FIG. 3C, the operating frequency of the switching power supply circuit 12 is set to 100 kHz, and the third predetermined value is set to 100 kHz× 0.4%=0.4 kHz. That is, the operating frequency of the switching power supply circuit 18 is set to 100.4 kHz. In this case, L1 denotes a frequency characteristic of the unnecessary radiation generated from the switching power supply circuit 12, L2 denotes a frequency characteristic of the unnecessary radiation generated from the switching power supply circuit 18, and L3 denotes a frequency characteristic of the unnecessary radiation of the total of frequency characteristic L1 and the frequency characteristic L2. Therefore, the peak value of the unnecessary radiation level of the frequency characteristic L3 is the same as the peak value of the unnecessary radiation levels of the frequency characteristic L1 and the frequency characteristic L2.

Referring to FIGS. 3A, 3B and 3C, it is beneficial to set the difference between the operating frequency of the switching power supply circuit 12 and the operating frequency of the switching power supply circuit 18 equal to or greater than 0.4% of the first operating frequency in order to minimize the peak value of the unnecessary radiation level of the total of all unnecessary radiations generated from the switching devices.

According to the multiple light projection type image display apparatus 1 and the control apparatus 90 therefor of the above embodiment, the difference between the frequency at which the unnecessary radiation level of the unnecessary radiation generated from the switching power supply circuit 12 becomes a peak and the frequency at which the unnecessary radiation level of the unnecessary radiation generated from the switching power supply circuit 18 becomes a peak becomes equal to or greater than the predetermined value. Therefore, it is possible to make the peak value of the total of unnecessary radiations generated from the switching power supply circuits 12 and 18 reduced further than the peak value of 41 dB of the unnecessary radiation level of the unnecessary radiations of these added up in an overlapped manner in an identical frequency band.

Second Embodiment

Although such a case where two light sources are provided has been described according to the multiple light projection type image display apparatus 1 of the first embodiment, it is also possible to provide three or more light sources. As one example, such a case that four light sources is provided is described below.

Figure 4:
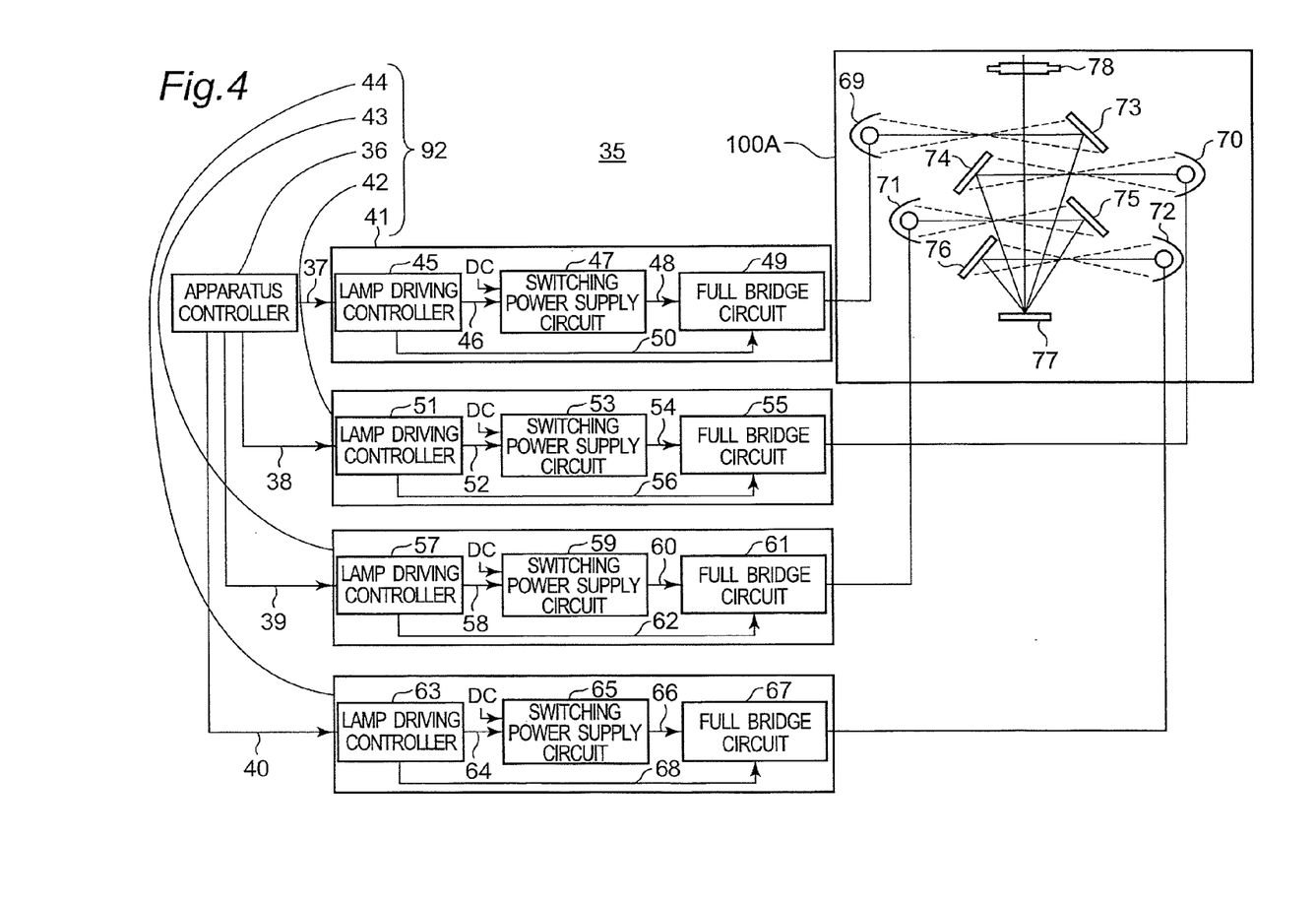
FIG. 4 is a block diagram showing a configuration of a multiple light projection type image display apparatus 35 according to a second embodiment of the present disclosure.

FIG. 4 is a block diagram showing a configuration of a multiple light projection type image display apparatus 35 according to the second embodiment of the present disclosure. The multiple light projection type image display apparatus 35 of FIG. 4 is configured to include a light source apparatus 100A that includes light sources 69, 70, 71 and 72 with reflectors serving as a light source part, and a control apparatus 92 that controls turning on of the light sources 69, 70, 71 and 72 with the reflectors. Moreover, the control apparatus 92 is configured to include a light source driver part 41 that drives the light source 69 with the reflector, a light source driver part 42 that drives the light source 70 with the reflector, a light source driver part 43 that drives the light source 71 with the reflector, a light source driver part 44 that drives the light source 72 with the reflector, and an apparatus controller 36 that controls the light source driver parts 41, 42, 43 and 44. Further, the light source apparatus 100A is configured to include four light sources 69, 70, 71 and 72 with the reflectors, a reflection type image display device 77 that outputs images, and mirrors 73, 74, 75 and 76 that guide the outgoing beams of light from the light sources 69, 70, 71 and 72 with the reflectors to the reflection type image display device 77.

The light source driver part 41 of FIG. 4 is configured to include a lamp driving controller 45 for controlling switching of the switching devices that configure a switching power supply circuit 47 described later, a switching power supply circuit 47 for converting a direct current voltage DC into a predetermined voltage in accordance with a switching timing signal 46 outputted from the lamp driving controller 45, and a full bridge circuit 49 for driving the light source 69 by alternating current. Moreover, the light source driver part 42 is configured to include a lamp driving controller 51 for controlling switching of the switching devices that configure a switching power supply circuit 53 described later, a switching power supply circuit 53 for converting a direct current voltage DC into a predetermined voltage in accordance with a switching timing signal 52 outputted from the lamp driving controller 51, and a full bridge circuit 55 for driving the light source 70 by alternating current. Further, the light source driver part 43 is configured to include a lamp driving controller 57 for controlling switching of the switching devices that configure a switching power supply circuit 59 described later, a switching power supply circuit 59 for converting a direct current voltage DC into a predetermined voltage in accordance with a switching timing signal 58 outputted from the lamp driving controller 57, and a full bridge circuit 61 for driving the light source 71 by alternating current. Furthermore, the light source driver part 44 is configured to include a lamp driving controller 63 for controlling switching of the switching devices that configure a switching power supply circuit 65 described later, a switching power supply circuit 65 for converting a direct current voltage DC into a predetermined voltage in accordance with a switching timing signal 64 outputted from the lamp driving controller 63, and a full bridge circuit 67 for deriving the light source 72 by alternating current. In this case, each of the switching power supply circuits 47, 53, 59 and 65 includes switching devices, and a capacitor, a coil and a diode as a rectifier circuit, and each of the full bridge circuits 49, 55, 61 and 67 is configured as a bridge circuit in which four switching devices are connected together.

Referring to FIG. 4, the outgoing beams of light from the light sources 69, 70, 71 and 72 with the reflectors are reflected by the mirrors 73, 74, 75 and 76, and guided to the reflection type image display device 77. Moreover, the lights from the light sources 69, 70, 71 and 72 with the reflectors collected by the mirrors 73, 74, 75 and 76 are reflected by the reflection type image display device 77 that outputs an image, and projected enlarged via a projection lens 78.

A device controller 36 generates a control signal 37 for setting the operating frequency of the switching power supply circuit 47, and outputs the control signal 37 to the lamp driving controller 45. Moreover, the lamp driving controller 45 generates a switching timing signal 46 for turning on/off the switching devices that configure the switching power supply circuit 47 on the basis of the control signal 37 from the apparatus controller 36, and outputs the switching timing signal 46 to the switching power supply circuit 47. Further, the switching power supply circuit 47 converts the inputted direct current voltage DC by turning on/off the inputted voltage DC by the duty ratio of the switching timing signal 46 on the basis of the switching timing signal 46 inputted from the lamp driving controller 45, thereafter rectifies the resulting voltage into a predetermined alternating current voltage 48, and outputs the direct current voltage 48 to the full bridge circuit 49. In this case, the switching timing signal 46 is the timing signal for turning on/off the switching devices that configure the switching power supply circuit 47 to operate the switching devices on the basis of the timing signal, and is converted into a predetermined direct current voltage corresponding to the ratio (duty ratio) of the turning on/off times of the switching devices.

The full bridge circuit 49 converts the direct current voltage 48 inputted from the switching power supply circuit 47 into an alternating current signal having a predetermined frequency by performing alternate switching control of one pair of mutually opposing switching devices and the other pair of switching devices of the full bridge circuit 49 by using a full bridge timing signal 50 inputted from the lamp driving controller 45, and transmits the alternating current signal to the light source 69 with the reflector to light the light source 69 with the reflector.

Moreover, operation of each of the light source driver parts 42, 43 and 44 is similar to that of the light source driver part 41. In detail, the lamp driving controllers 51, 57 and 63 generate switching timing signals 52, 58 and 64 for determining the duty ratios of the switching devices of the switching power supply circuits 53, 59 and 65, respectively, of the succeeding stages on the basis of the control signals 38, 39 and 40 for setting the operating frequencies of the switching power supply circuits 53, 59 and 65. The switching power supply circuits 53, 59 and 65 convert the inputted direct current voltage DC into predetermined direct current voltages 54, 60 and 66 on the basis of the switching timing signals 52, 58 and 64, respectively. The full bridge circuits 55, 61 and 67 convert the direct current voltages 54, 60 and 66 into alternating current signals having predetermined frequencies by using the full bridge timing signals 56, 62 and 68 and are inputted from the lamp driving controllers 51, 57 and 63, respectively, and transmits the alternating current signals to the light sources 70, 71 and 72 with the reflectors to light the light sources 70, 71 and 72 with the reflectors. It is noted that the control signals 37, 38, 39 and 40 from the apparatus controller 36 may be synchronized or not synchronized with one another.

Figure 5:
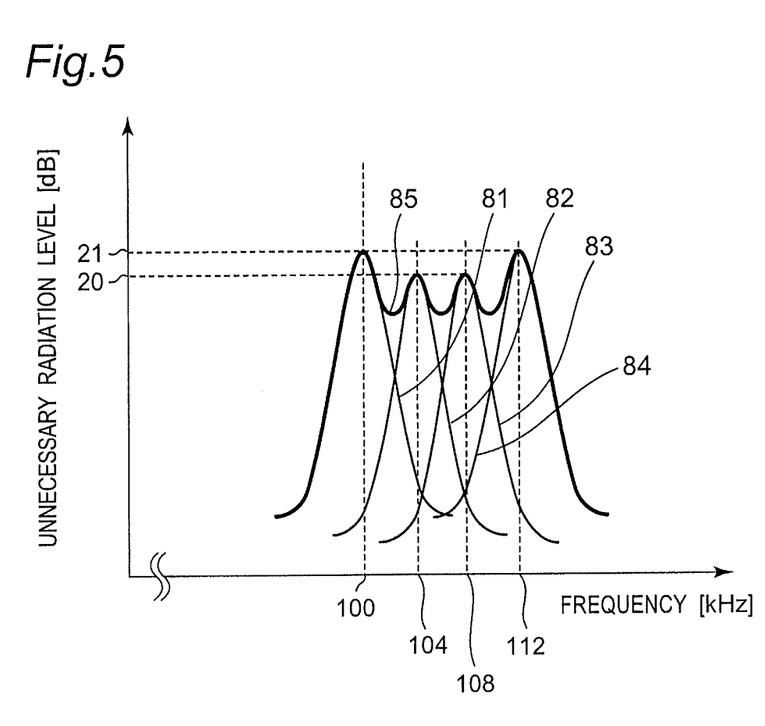
FIG. 5 is a spectral diagram showing frequency characteristics of unnecessary radiations generated from the switching power supply circuits 47, 53, 59 and 65 of the light source driver parts 41, 42, 43 and 44 of the multiple light projection type image display apparatus 35 of FIG. 4.

FIG. 5 is a spectral diagram showing frequency characteristics of unnecessary radiations generated from the switching power supply circuits 47, 53, 59 and 65 of the light source driver parts 41, 42, 43 and 44 of the multiple light projection type image display apparatus 35 of FIG. 4. In FIG. 5, 81 denotes a frequency characteristic of unnecessary radiation generated from the switching power supply circuit 47, 82 denotes a frequency characteristic of unnecessary radiation generated from the switching power supply circuit 53, and 83 denotes a frequency characteristic of unnecessary radiation generated from the switching power supply circuit 59. 84 denotes a frequency characteristic of unnecessary radiation generated from the switching power supply circuit 65. 85 denotes a frequency characteristic of unnecessary radiation of a total of frequency characteristic 81, the frequency characteristic 82, the frequency characteristic 83 and the frequency characteristics 84.

In FIG. 5, when the operating frequency of the switching power supply circuit 47 of FIG. 4 is set to 100 kHz±5%, the operating frequency of the switching power supply circuit 53 of FIG. 4 is set to 104 kHz±5%, the operating frequency of the switching power supply circuit 59 of FIG. 4 is set to 108 kHz±5%, and the operating frequency of the switching power supply circuit 63 of FIG. 4 is set to 112 kHz±5%, the frequency characteristic 81 varies with a value in the vicinity of ±5% around the peak value of 100 kHz, the frequency characteristic 82 varies with a value in the vicinity of ±5% around the peak value of 104 kHz, the frequency characteristic 83 varies with a value in the vicinity of ±5% around the peak value of 108 kHz, and the frequency characteristic 84 varies with a value in the vicinity of ±5% around the peak value of 112 kHz. Moreover, the peak of the level of the frequency characteristic 81 becomes 21 dB, and the peak value of the level of the frequency characteristic 82 becomes 20 dB. The peak of the level of the frequency characteristic 83 becomes 20 dB, and the peak of the level of the frequency characteristic 84 becomes 21 dB. Further, each of a difference between the operating frequency of the switching power supply circuit 47 and the operating frequency of the switching power supply circuit 53, a difference between the operating frequency of the switching power supply circuit 53 and the operating frequency of the switching power supply circuit 59, and a difference between the operating frequency of the switching power supply circuit 59 and the operating frequency of the switching power supply circuit 65 becomes equal to or greater than a predetermined value, and therefore, the peak values of the frequency levels of the frequency characteristics 81, 82, 83 and 84 deviate from one another. Therefore, the peak value of the frequency characteristic 85 that is the total of frequency characteristic 81, the frequency characteristic 82, the frequency characteristic 83 and the frequency characteristic 84 becomes a value in the vicinity of 21 dB identical to the peak value of each of the frequency characteristics 81 and 84.

As described above, when the difference between the frequency at which the unnecessary radiation level of the unnecessary radiation generated from the switching power supply circuit 47 becomes a peak and the frequency at which the unnecessary radiation level of the unnecessary radiation generated from the switching power supply circuit 53 becomes a peak, the difference between the frequency at which the unnecessary radiation level of the unnecessary radiation generated from the switching power supply circuit 53 becomes a peak and the frequency at which the unnecessary radiation level of the unnecessary radiation generated from the switching power supply circuit 59 becomes a peak, and the difference between the frequency at which the unnecessary radiation level of the unnecessary radiation generated from the switching power supply circuit 59 becomes a peak and the frequency at which the unnecessary radiation level of the unnecessary radiation generated from the switching power supply circuit 65 becomes a peak are each set equal to or greater than a predetermined value, the peak value of the unnecessary radiation level of the total of unnecessary radiations generated from the switching power supply circuits 47, 53, 59 and 65 is reduced further than the peak value of 82 dB of the unnecessary radiation level of the unnecessary radiations of these added up in an overlapped manner in an identical frequency band. That is, by setting the predetermined value equal to or greater than 0.4% of the operating frequency of the switching power supply circuit 47, the peak value of the level of the total of these unnecessary radiations can be made equivalent to the peak value of the unnecessary radiation level of the individual unnecessary radiations.

According to the multiple light projection type image display apparatus 35 and the control apparatus 92 therefor of the above embodiment, intervals between the frequencies at which the unnecessary radiation level of the unnecessary radiations generated from the switching power supply circuits 47, 53, 59 and 65 become equal to or greater than the predetermined value. Therefore, the peak value of the unnecessary radiation level of the unnecessary radiations generated from the switching power supply circuits 47, 53, 59 and 65 can be reduced further than the peak value of the unnecessary radiation level of the unnecessary radiations of these added up in the overlap manner in the identical frequency band.

Third Embodiment

Although the plurality of light source driver parts are provided in accordance with the number of the plurality of light sources, and the plurality of light source driver parts are simultaneously driven at respective different frequencies in the first and second embodiments, the present embodiment is characterized by having a switchover part 93 such that the a plurality of light sources 4 and 5 are driven sequentially at different frequencies by one light source driver part 94, and the plurality of light sources 4 and 5 are driven at respective different frequencies.

Figure 6A:
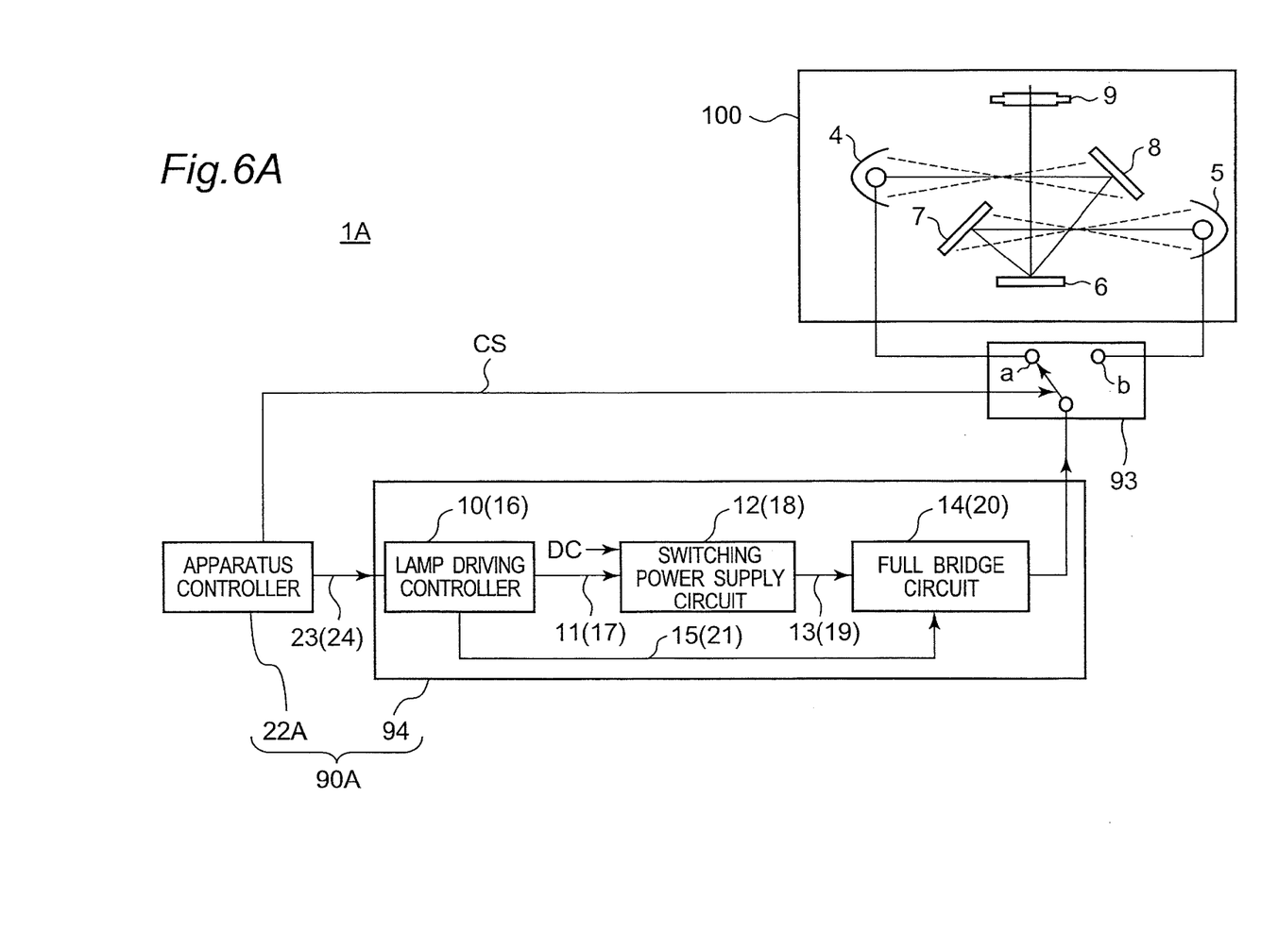
FIG. 6A is a block diagram showing a configuration of a multiple light projection type image display apparatus 1A according to a third embodiment of the present disclosure.

FIG. 6A is a block diagram showing a configuration of a multiple light projection type image display apparatus 1A according to the third embodiment of the present disclosure. The multiple light projection type image display apparatus 1A of the third embodiment of FIG. 6A is characterized in that a control apparatus 90A is provided in place of the control apparatus 90, and a switchover part 93 which is switchover means for performing switchover so as to input an output signal from one light source driver part 94 for driving the light source 4 and 5 at different frequencies to each of the light sources 4 and 5 is provided in the succeeding stage of the control apparatus 90A by comparison to the multiple light projection type image display apparatus 1 of FIG. 1. Moreover, the control apparatus 90A is characterized in that an apparatus controller 22A is provided in place of the apparatus controller 22, and the light source driver part 94 is provided in place of the light source driver parts 2 and 3 by comparison to the control apparatus 90 of FIG. 1.

The apparatus controller 22A of FIG. 6A is characterized in that a switchover signal CS for turning on/off a switchover part 93 which is switchover means for performing switchover so that an output signal from one light source driver part 94 for driving the light sources 4 and 5 at different frequencies is inputted to each of the light sources 4 and 5 is further generated, and the switchover signal CS is outputted to the switchover part 93 by comparison to the apparatus controller 22 of FIG. 1. In this case, when turning on the light source 4 with the reflector, the apparatus controller 22A generates a switchover signal CS for driving the light source 4 at a first frequency by the light source driver part 94, and controls the light source driver part 94 to operate in a manner similar to that of the light source driver part 2 of the first embodiment simultaneously with a switchover of the switchover part 93 to a contact "a". Moreover, when turning on the light source 5 with the reflector, the apparatus controller 22A generates a switchover signal CS for driving the light source 5 at a second frequency different from the first frequency by the light source driver part 94, and controls the light source driver part 94 to operate in a manner similar to that of the light source driver part 3 of the first embodiment simultaneously with a switchover of the switchover part 93 to a contact "b". That is, the switchover part 93 performs alternate switchover between the contact "a" and the contact "b". This operation will be described below.

Figure 6B:
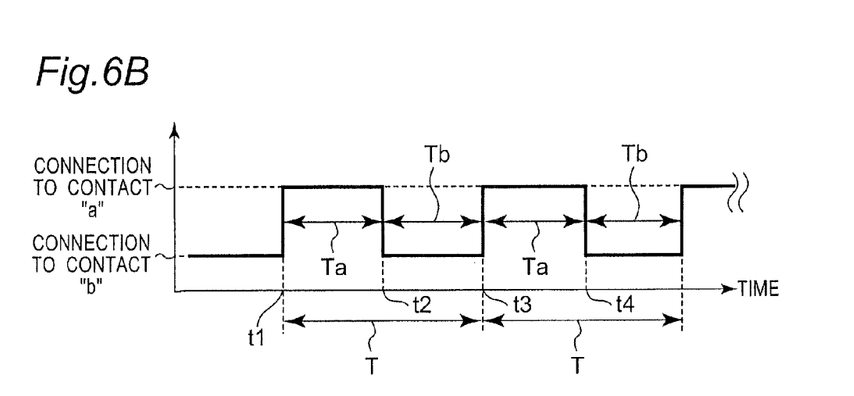
FIG. 6B is a timing chart showing switching timings of the switchover part 93 of FIG. 6A.

FIG. 6B is a timing chart showing switching timings of the switchover part 93 of FIG. 6A. Referring to FIG. 6B, the switchover part 93 performs switchover to the contact "a" at a timing t1, and performs switchover to the contact "b" at a timing t2. Next, the switchover part 93 performs switchover to the contact "a" at a timing t3, and performs switchover to the contact "b" at a timing t4. This switching control is repeated sequentially. In this case, the light source 4 with the reflector turns on for a time interval Ta (=timing t2−timing t1) during connection to the contact "a", and the light source 5 with the reflector turns on for a time interval Tb (timing t3−timing t2) during connection to the contact "b". In this case, the time T of one cycle of the switching of the switchover part 93 becomes a time interval T=the time interval Ta+the time interval Tb. It is noted that the time interval T of one cycle is set sufficiently smaller than (1/100 kHz). Therefore, it seems that the light source 4 with the reflector and the light source 5 with the reflector are simultaneously turned on.

According to the multiple light projection type image display apparatus 1A and the control apparatus 90 therefor of the above embodiment, advantageous effects similar to those of the first embodiment can be obtained.

First Modified Embodiment

Figure 6C:
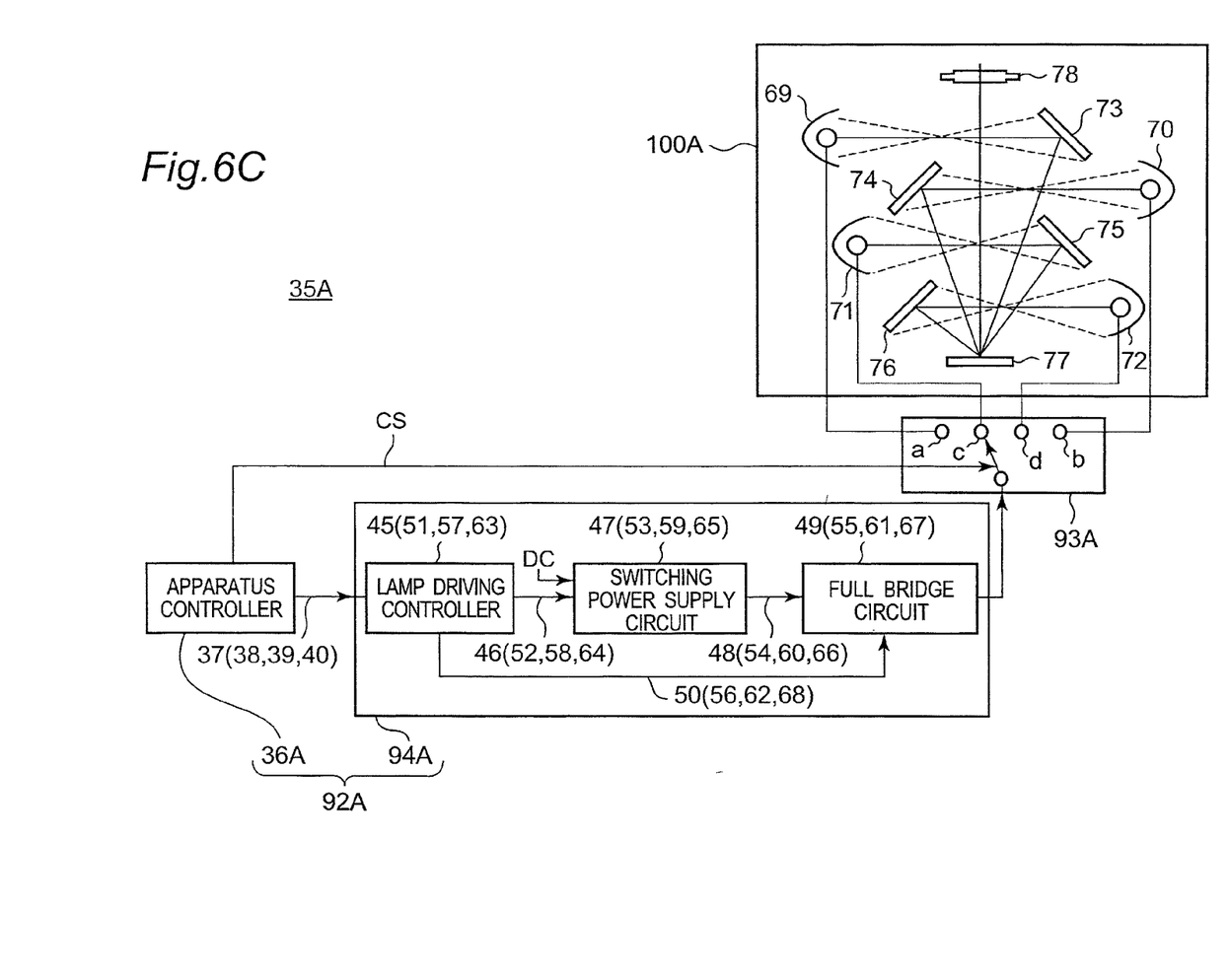
FIG. 6C is a block diagram showing a configuration of a multiple light projection type image display apparatus 35A according to a modified embodiment of the third embodiment of the present disclosure.

FIG. 6C is a block diagram showing a configuration of a multiple light projection type image display apparatus 35A according to a modified embodiment of the third embodiment of the present disclosure. The multiple light projection type image display apparatus 35A of FIG. 6C is characterized in that a control apparatus 92A is provided in place of the control apparatus 92, and a switchover part 93A of switchover means for performing switchover so as to supply an output signal from one light source driver part 94A for driving the light sources 69, 70, 71 and 72 at different frequencies to each of the light sources 69, 70, 71 and 72 is provided in the succeeding stage of the control apparatus 92A by comparison to the multiple light projection type image display apparatus 35 of FIG. 4. Moreover, the control apparatus 92A is characterized in that an apparatus controller 36A is provided in place of the apparatus controller 36, and the light source driver part 94A is provided in place of the light source driver part 94 by comparison to the control apparatus 92 of FIG. 4.

The apparatus controller 36A of FIG. 6C is characterized in that a switchover signal CS for inputting an output signal from the light source driver part 94 for driving the light sources 69 to 72 at different frequencies is inputted to each of the light sources 69 to 72 is further generated, and the switchover signal CS is outputted to the switchover part 93A by comparison to the apparatus controller 36 of FIG. 4. In this case, when turning on the light source 69 with the reflector, the apparatus controller 36A generates a switchover signal CS for driving the light source 69 at a first frequency by the light source driver part 94A, and controls the light source driver part 94 to operate in a manner similar to that of the light source driver part 41 of the second embodiment simultaneously with a switchover of the switchover part 93A to a contact "a". Moreover, when turning on the light source 70 with the reflector, the apparatus controller 36A generates a switchover signal CS for driving the light source 70 at a second frequency by the light source driver part 94A, and controls the light source driver part 94A to operate in a manner similar to that of the light source driver part 42 of the second embodiment simultaneously with a switchover of the switchover part 93A to a contact "b". Further, when turning on the light source 71 with the reflector, the apparatus controller 36A generates a switchover signal CS for driving the light source 71 at a third frequency by the light source driver part 94A, and controls the light source driver part 94A to operate in a manner similar to that of the light source driver part 43 of the second embodiment simultaneously with a switchover of the switchover part 93A to a contact "c". Furthermore, when turning on the light source 72 with the reflector, the apparatus controller 36A generates a switchover signal CS for driving the light source 72 at a fourth frequency by the light source driver part 94A, and controls the light source driver part 94A to operate in a manner similar to that of the light source driver part 44 of the second embodiment simultaneously with a switchover of the switchover part 93A to a contact "d".

As described above, the switchover part 93A sequentially repeats switchover to each of the contacts "a", "b", "c" and "d". For example, the apparatus controller 36A controls the light source driver part 94A and the switchover part 93A so that the frequencies of 100 kHz, 104 kHz, 108 kHz and 112 kHz are sequentially supplied to the four light sources 69, 70, 71 and 72 by the switchover part 93A. In this case, the duration of one cycle of the switching of the switchover part 93A is a sum of durations of connections to respective contacts "a", "b", "c" and "d", and the duration of one cycle is set sufficiently smaller than (1/100 kHz). Therefore, it seems that the light sources 69, 70, 71 and 72 with the reflectors are turned on simultaneously.

According to the multiple light projection type image display apparatus 35A and the control apparatus 92 therefor of the above modified embodiment, advantageous effects similar to those of the second embodiment can be obtained.

Although the projection type image display apparatus of two light type or four light type has been described in the aforementioned embodiments and modified embodiment, the present disclosure is not limited to these, and similar action and advantageous effects can be obtained by the multiple light projection type image display apparatus that turns on a plurality of light sources at the time of image projection. Moreover, although such a case that these driving frequencies are varied each with a difference of 4 kHz has been described in order to drive the plurality of light sources at respective different frequencies, the present disclosure is not limited to this, and similar advantageous effects can be obtained even the frequencies are set so as to be a difference equal to or larger than the predetermined frequency so that the peak values of the unnecessary radiation levels of the plurality of unnecessary radiations generated by the switching devices of the respective light source driver parts do not overlap.

Moreover, although the apparatus controllers 22A and 36A in the third embodiment and its modified embodiment control the light source driver parts 94 and 94A to drive the light source at at respective different frequencies by the light source driver parts 94 and 94A, and the switchover parts 93 and 93A are synchronously controlled, the present disclosure is not limited to this configuration. For example, it is acceptable that the light source driver parts 94 and 94A drive the light sources independently of each other at respective different frequencies, the apparatus controllers 22A and 36A detect timings to drive the light sources at respective different frequencies, and the switchover parts 93 and 93A are synchronously controlled.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A control apparatus for use in a multiple light projection type image display apparatus including a plurality of light sources, the control apparatus comprising:
    a plurality of light source driver parts configured to drive a plurality of light sources respectively; and
    an apparatus controller configured to control the plurality of light source driver parts,
    wherein each of the plurality of light source driver parts includes a switching power supply circuit,
    wherein the plurality of light source driver parts are provided in correspondence with the plurality of light sources respectively, and
    wherein the apparatus controller controls the plurality of light source driver parts to drive the switching power supply circuits at operation frequencies different from each other.

2. The control apparatus for use in the multiple light projection type image display apparatus as claimed in claim 1,
    wherein the apparatus controller controls the light source driver parts to output a plurality of different frequencies to the plurality of light sources, and
    wherein the apparatus controller controls a switchover part for performing switchover of an output from the light source driver part so that signals of the plurality of frequencies are inputted to the plurality of light sources.

3. The control apparatus for use in the multiple light projection type image display apparatus as claimed in claim 1,
    wherein the apparatus controller controls the light source driver parts so that frequency differences upon driving the plurality of light sources each become equal to or greater than a predetermined value.

4. The control apparatus for use in the multiple light projection type image display apparatus as claimed in claim 1,
    wherein the light source driver parts output signals of a plurality of different frequencies to the plurality of light sources, and
    wherein the apparatus controller controls a switchover part for performing switchover of an output signal from the light source driver part so that the signals of the plurality of frequencies are inputted to the plurality of light sources.

5. The control apparatus for use in the multiple light projection type image display apparatus as claimed in claim 4,
    wherein the light source driver parts drive the plurality of light sources so that the frequency differences upon driving the plurality of light sources each become equal to or greater than a predetermined value.

6. A multiple light projection type image display apparatus comprising:
    a plurality of light sources;
    a plurality of light source driver parts configured to drive the plurality of light sources respectively; and
    an apparatus controller configured to control the plurality of light source driver parts,
    wherein each of the plurality of light source driver parts includes a switching power supply circuit,
    wherein the plurality of light source driver parts are provided in correspondence with the plurality of light sources respectively, and
    wherein the apparatus controller controls the plurality of light source driver parts to drive the switching power supply circuits at operation frequencies different from each other.

* * * * *